United States Patent
Brooks

(10) Patent No.: US 9,945,144 B2
(45) Date of Patent: Apr. 17, 2018

(54) LAWN STAKE FOR SUPPORTING DECORATIVE ELEMENTS

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

(21) Appl. No.: 14/999,829

(22) Filed: Jul. 5, 2016

(65) Prior Publication Data

US 2017/0051523 A1 Feb. 23, 2017

Related U.S. Application Data

(63) Continuation-in-part of application No. 14/999,498, filed on Feb. 25, 2016, which is a continuation-in-part of application No. 14/121,469, filed on Sep. 9, 2014, now Pat. No. 9,316,016, which is a continuation-in-part of application No. 13/998,981, filed on Dec. 30, 2013, now abandoned.

(60) Provisional application No. 62/231,357, filed on Jul. 3, 2015.

(51) Int. Cl.
| | |
|---|---|
| *A01K 1/04* | (2006.01) |
| *E04H 12/22* | (2006.01) |
| *A01M 31/06* | (2006.01) |
| *F21V 21/08* | (2006.01) |

(52) U.S. Cl.
CPC ......... *E04H 12/2223* (2013.01); *A01M 31/06* (2013.01); *E04H 12/2269* (2013.01); *F21V 21/0824* (2013.01)

(58) Field of Classification Search
CPC ...... A01K 39/00; E02D 5/801; E04H 12/2223
See application file for complete search history.

(56) References Cited

U.S. PATENT DOCUMENTS

| | | |
|---|---|---|
| 32,226 A | 4/1861 | Dotson |
| 168,890 A | 10/1875 | Field |
| 345,877 A | 7/1886 | Brainard |
| 907,799 A | 12/1908 | Hawley |
| 1,562,343 A | 11/1925 | Post |
| 2,269,996 A | 1/1942 | Milton et al. |
| 2,447,444 A | 8/1948 | Waite |
| 2,563,159 A | 8/1951 | Louis |
| 2,901,789 A | 9/1959 | Frank |
| 3,688,454 A | 9/1972 | Wolfcarius |
| 4,928,418 A | 5/1990 | Stelly |
| 5,098,057 A | 3/1992 | Gran |
| 6,116,760 A | 9/2000 | Cox |
| 6,412,236 B1 | 7/2002 | Johnson |
| 6,481,147 B2 | 11/2002 | Lindaman |
| 6,487,977 B1 | 12/2002 | Willaims |
| 6,588,723 B1 * | 7/2003 | Moran, III ............. A01K 39/00 248/156 |

(Continued)

*Primary Examiner* — Amy J. Sterling
(74) *Attorney, Agent, or Firm* — Carrithers Law Office, PLLC

(57) ABSTRACT

A stake for including a vertical shaft having a cork screw or a helical coil formed in the bottom end, a top end capable of supporting a decorative element, and having an S-shaped handle formed in the center for enabling the screwing of the cork screw into the ground for vertical stabilization of the stake. The bottom helical coil ends with a sharp tip for easing the installation into the ground.

9 Claims, 2 Drawing Sheets

(56) References Cited

U.S. PATENT DOCUMENTS

| | | |
|---|---|---|
| 6,698,132 B1 | 3/2004 | Brint |
| 6,810,630 B2 | 11/2004 | Chizmas |
| 6,901,693 B1 | 6/2005 | Crowe |
| D550,071 S | 9/2007 | Powell |
| D554,980 S | 11/2007 | Mihelis |
| 7,493,873 B2 | 2/2009 | Petersen |
| 8,230,638 B1 | 7/2012 | Dunaway |
| 2005/0268522 A1 | 12/2005 | Foster |
| 2008/0307721 A1* | 12/2008 | Schultz .................. E02D 5/801 52/157 |

\* cited by examiner

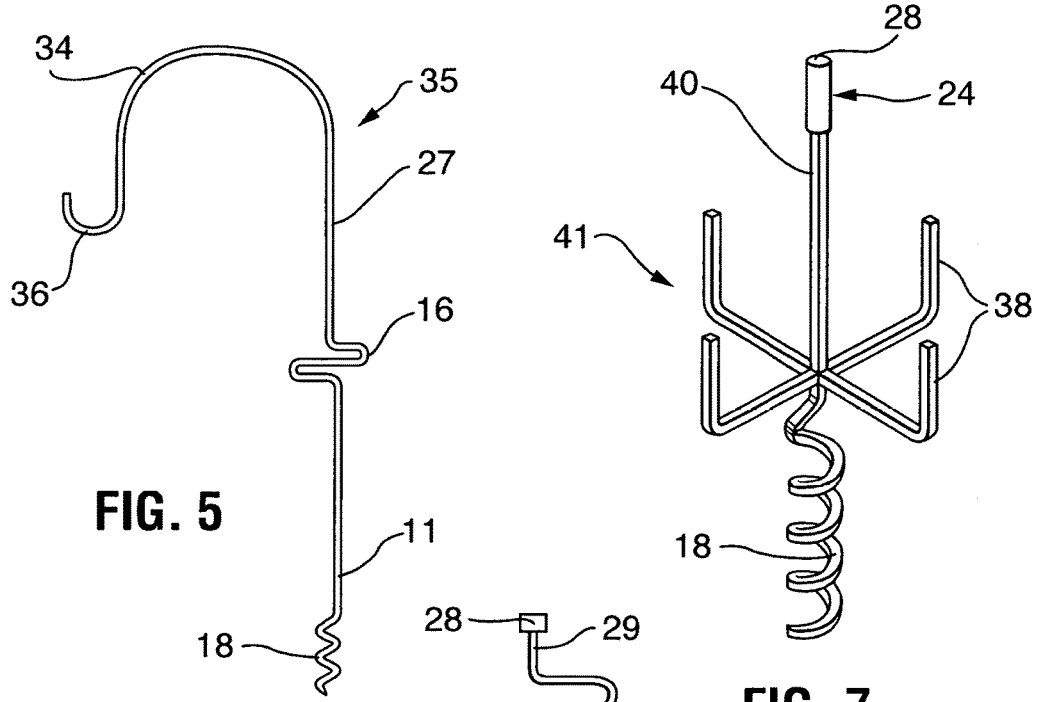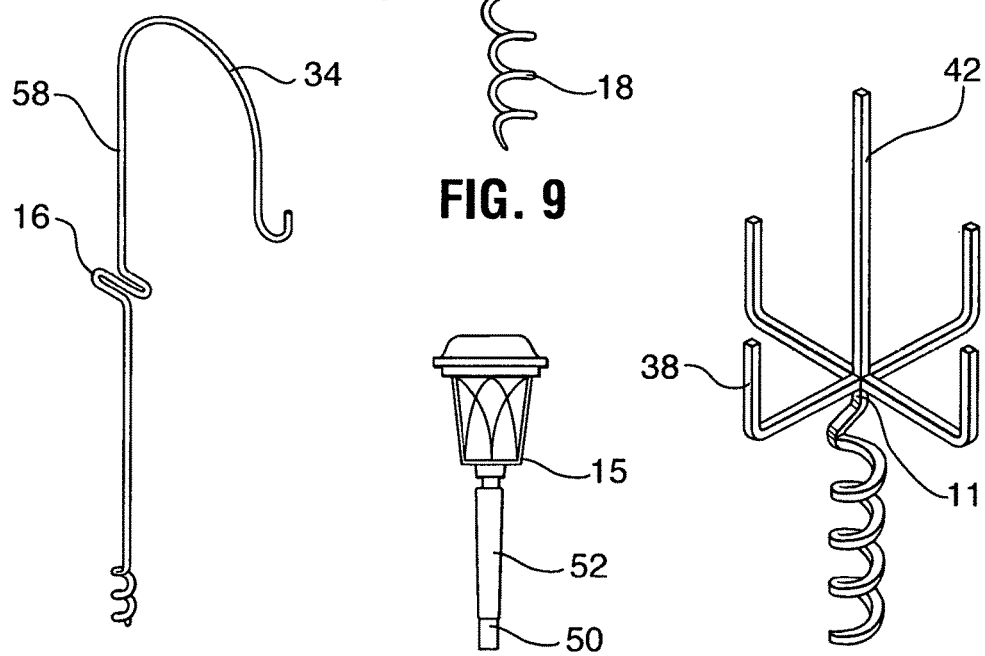

LAWN STAKE FOR SUPPORTING DECORATIVE ELEMENTS

CROSS REFERENCES TO RELATED APPLICATIONS

This application claims priority from U.S. Provisional Application Ser. No. 62/231,357 filed on Jul. 3, 2015 and U.S. application Ser. No. 14/999,498 filed on Feb. 25, 2016 which is a Continuation in Part of U.S. Pat. No. 9,316,016 which issued from Ser. No. 14/121,469 on Apr. 19, 2016 which claims priority from U.S. application Ser. No. 13/998,981 filed on Dec. 30, 2013 all of which are incorporated herein in their entirety.

TECHNICAL FIELD

The present invention relates to the field of stakes which can be screwed into the lawn or ground for vertical stabilization and provide for support of decorative elements such as light fixtures, flower pots, bird feeders, and the like.

BACKGROUND OF THE INVENTION

Decorative elements such as flower pots, light fixtures, bird feeders are used in lawns and gardens work-wide. It is often desired to display these elements in and elevated setting such as hanging flower pots from the ceiling of a porch. However, users frequently want to display such decorative elements in the yard or garden away from the porch, house or out buildings. Sometimes, flower pots are placed on a porch floor, patio or even in the grass. However, due to the presence of small animals and snakes, it is highly preferable to hang such elements above the ground or floor, safely away from such creatures.

Hooks and brackets provide a means to hang decorative elements from structures such as a house, a porch, wooden posts or out buildings. But because of the inconvenience and undesirable appearance of hanging elements on one's house or porch, it is desirable to provide support for these in the lawn or garden area.

The portable and reusable lawn stake of the present invention includes a shaft which can be installed in the ground with no tools but rather by twisting and rotating the handle screwing the helical coil base into the ground. A receiver at the upper end provides support to hold decorative elements vertically above the ground.

SUMMARY OF THE INVENTION

In accordance with the present invention, there is provided a lawn stake comprising, consisting of, or consisting essentially of a vertical rod having a helical coil extending downward therefrom a selected distance for penetration into the ground. The free end at the bottom end of the helical coil is sharp for penetration into soil. An S-shaped handle extends vertically upward from the top portion of the vertical rod, including at least two looped sections spaced apart from and in vertical alignment with one another. An upward extending receiver is fixed above the S-shaped rotary handle providing for attachment of a decorative element.

A lawn stake comprising a bottom section including a helical spiral coil having a constant radius and extending downward therefrom a selected distance including a tapered point for penetration into the ground. A medial section extends upward from the bottom section defining an elongated vertical rod. A handle section extends from the medial section comprises a curved rod forming at least one "S" shaped loop having a first horizontal segment extending outwardly from the medial section at an angle a selected first length and having a proximate end portion curving upward forming a first curved loop extending upward and over the first horizontal segment and past the medical section. A selected second length defines a second horizontal section spaced apart from and in alignment with the first horizontal section. The second horizontal segment forms a second curved loop extending upward and over a portion of the second horizontal segment forming a third horizontal segment extending to the medial section spaced apart and in alignment with the second horizontal segment. The third horizontal segment forms an angle extending upward forming a top section. The top section defines a rod in vertical alignment with the medial section for supporting an article thereon. An arcuate portion extending from the top section including a holding means disposed on a distal end thereof for supporting an article.

It is an object of this invention to provide a reusable lawn stake which includes a helical coil at one end which can be screwed into the ground.

It is an object of this invention to provide a reusable lawn stake which includes an integral crank handle for the purpose of screwing the stake into the ground.

It is an object of this invention to provide an integral crank handle for the purpose of screwing the stake into the ground wherein the shaft of the stake includes a helical coil to be installed into the ground to provide substantially vertical support of decorative elements with respect to the ground.

It is another object of the present invention to provide a lawn stake wherein the integral handle serves to brace the stake when the stake is fully installed into the soil with the handle in contact with the soil.

It is another object of the present invention to provide a lawn stake including a tubular receiver with a thumb screw for removably inserting and fastening the downward extending shaft portion of a selected decorative element such as a light fixture or flower pot for vertical support above the ground.

It is another object of the present invention to provide a lawn stake including a vertical shaft with a helical coil at the bottom end, a handle for rotating or screwing the coil into the ground and a shepherd's hook at the top end with and upward curling end for holding a selected decorative element such as a light fixture or flower pot for vertical support above the ground.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 5 is a front view of a lawn stake comprising a shaft including a helical coil at the bottom end, an S-shaped rotary handle at the upper center, and resembling a shepherd's hook at the top wherein the end of the shepherd's hook curls upward to form a support hook.

FIG. 6 is a perspective view of the lawn stake of FIG. 5.

FIG. 7 is a downward perspective view of a lawn stake including a downward extending helical coil at the bottom, an upward extending shaft with a tubular receiver and thumb screw clamp and four L-shaped rotary handles wherein the free end of the first leg of each L-shaped handle extends radially outwards from just above the helical coil and the second leg of each L-shaped handle extends vertically upwards.

FIG. 8 is a perspective view of the lawn stake of FIG. 7 not including the tubular receiver or thumb screw.

FIG. 9 is a front view of lawn stake with a downward extending helical coil at the bottom, an S-shaped rotary handle above the helical coil, and an upward extending vertical shaft with lug at the top end for attaching a decorative element.

FIG. 10 is a front view of a light fixture with a downward extending lug sized and shaped to be removably inserted and locked into a tubular receiver on a lawn stake such as the one in FIG. 4.

DESCRIPTION OF THE PREFERRED EMBODIMENTS

Figure 1:
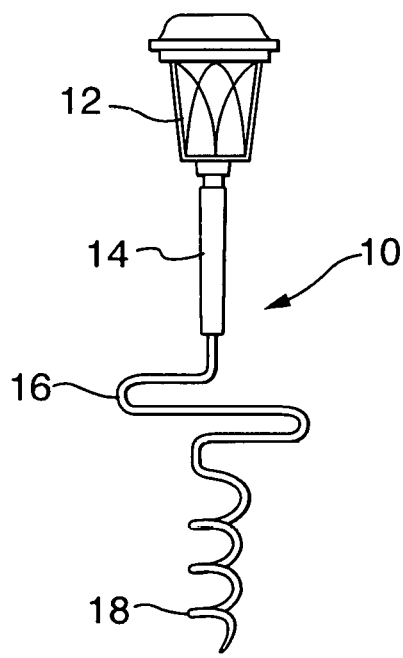
FIG. 1 is a front view of a lawn stake with an outdoor light fixture with a helical coil, an S-shaped rotary handle, and a light fixture with a base including batteries.

In accordance with the present invention, there is provided a lawn stake 10 comprising a vertical shaft 11 with a helical coil 18 at the bottom end, an S-shaped rotary handle 16 extending vertically upward from the upper end of the helical coil 18, and a receiver extending upward from the top end of the S-shaped rotary handle for holding a decorative fixture such as a light 12, as shown in FIGS. 1-3 and 9.

Figure 3:
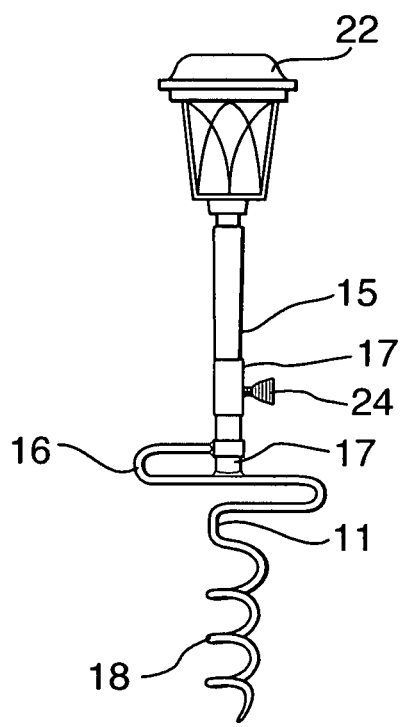
FIG. 3 is a front view of a lawn stake with an outdoor light fixture with a helical coil, an S-shaped rotary handle, and a light fixture with a base including rechargeable batteries and a solar cell in the top for charging the batteries wherein the S-shaped rotary handle is reinforced by attachment of the downward extending receiver tube to a center point of the S-shaped handle.
Figure 4:
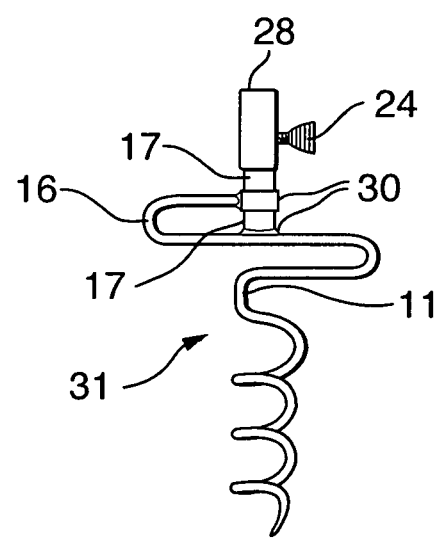
FIG. 4 is a front view of a lawn stake with a downward extending helical coil, an S-shaped rotary handle and a vertical receiver tube with a clamping screw.

The receiver defines a upper aperture 28 in FIG. 9 shows a lug fixedly attached above the S-shaped handle 16. A lighting fixture or other decorative fixture is fixedly attached to the lug 50 by welding or with fasteners such as screws and nuts inserted into apertures provided in the lug and the bottom of the decorative fixture to be added to the lawn stake. One preferred embodiment includes a tubular receiver 17 with a thumbscrew 24 as shown in FIGS. 3 and 4. A fixture 15 which would be suitable for attachment to such a lawn stake is shown in FIG. 10 and includes a body 52 with a downward extending lug 50 which is sized and shaped to be inserted into the upper aperture 28 and to fit snugly into the tubular receiver 17. The thumbscrew 24 is then tightened to lock the fixture in place.

The tubular receiver 17 with mounting sleeve adapter 28 and the lug 50 are preferably square but can be circular as shown in FIG. 7 or any other shape which provides for easy and secure holding of the decorative fixture within the lawn stake.

Figure 2:
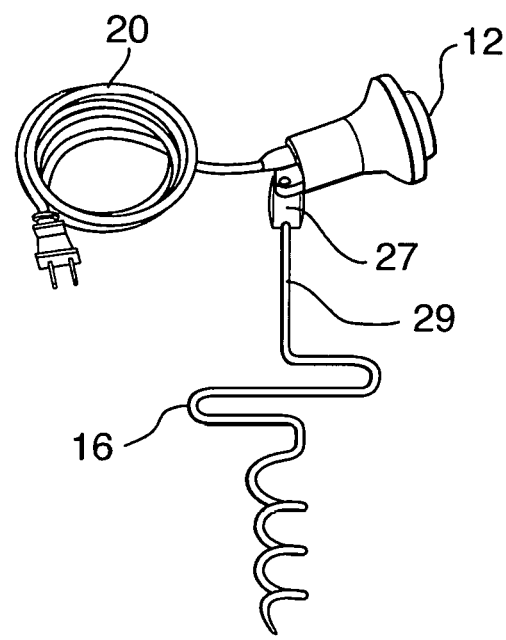
FIG. 2 is a front view of a lawn stake with an outdoor light fixture with a helical coil, an S-shaped rotary handle, and a light fixture including a power cord for delivering electrical power to the light fixture.

The lawn stake 10 in FIG. 1 has a battery operated light fixture attached at the upper end whereas the lawn stake 10 in FIG. 2 has a light fixture with power cord attached at it's upper end. The battery operated light fixture of FIG. 3 includes a solar charger 22 to charge the batteries.

FIGS. 1 and 2 show a lawn stake 10 with a simple S-shaped rotary handle with no reinforcement. However, one preferred embodiment, the lawn stake 31 in FIGS. 3 and 4 has a reinforced S-shaped handle 16. At the upper end of the stake is a receiver tube 17 which is connected to the top end of the S-handle 16 and again at the middle of the S-handle. This double attachment of the receiver tube 17 to the S-handle reinforces the handle against bending or twisting and gives stronger support of the decorative element which is mounted in the receiver tube. As shown in FIGS. 3 and 4, the receiver tube includes a thumb screw 24 for clamping the downward extending shaft of the decorative element firmly in the tube.

One preferred embodiment of the present invention includes an elongated section of bar stock for forming a vertical rod having a helical spiral coil extending downward therefrom a selected distance for penetration into the ground, and at least one loop such as a "S" shaped loop extending from a top portion of said rod comprising at least two looped sections spaced apart from and in vertical alignment with one another for receiving an arm of a tie down. A medial portion comprises an elongated rod joining a bottom portion comprising a helical spiral coil having a point extending downward from the elongated rod for a selected distance for penetration into the ground. The top portion defines a handle means comprises means for rotation such as a curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

As shown in the figures, the helical auger is shown as a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion. The rotary auger support includes an above ground upright rod or shaft top portion having an offset neck extending from the center of the helix outward toward the periphery of the helix forming the main body portion comprising a plurality of helixes. A distal end segment comprises a helix portion ending in a sharp point. The angle of the twists forming the flights of the helix of the main body portion are angled forming a plane. The neck is angled inwardly toward the center of said the body portion in order to center the bottom section with respect to the medial section and the top section. The helix shape enable the auger to cut through soil and debris for ease of rotation and deep ground penetration. Moreover, the auger of the present invention is an improvement over the flights of conventional augers in that the narrow diameter of the stock and diameter of the flights enables the auger to cut and drill through small openings in rocky soil and wedge between rocks and rotatably inserted into hard clay which would resist penetration by an auger having flights.

The lawn stake 35 in FIGS. 5 and 6 includes vertical shaft 11 with helical coil 18 extending downward therefrom at the bottom end and an S-shaped rotary handle 16 extending vertically upward from above the helical coil 18. The lawn stake in FIG. 5 includes a receiver 27 extending upward from the top end of the S-shaped rotary handle 16 for attaching the shepherds hook 34 above the S-shaped rotary handle 16. As can be seen in the figures, the lawn stake can include extended straight sections 11 and 58 to provide for higher vertical support as in FIGS. 5 and 6. Other lawn stakes are shorter to support a fixture just above the ground such as the light fixtures of FIGS. 1-3.

FIGS. 7 and 8 show a lawn stake wherein the S-shaped rotary handle 16 is replaced with an X-shaped structure 41. The X-shaped portion of the rotary handle is perpendicular to the shaft 42 of the lawn stake and includes at least two upward extending shafts 38 forming handles attached at the ends of two of the legs of the X-shaped handle 41. The lawn stakes of FIGS. 7 and 8 include four upward extending shafts 38 forming handles. The upward extending shafts 42 supports and cooperatively engages a sleeve adapter 29 disposed on the distal end of an article to be supported thereby to provide better control of the lawn stake during installation into the soil. Further, when installed properly, the X-shape portion is in full contact with the soil and provides for stable support of the lawn stake and the attached decorative element.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A lawn stake comprising:
   a bottom section extending from a bottom distal end of said medial section, said bottom section comprising a helical spiral coil having a constant radius and extending downward therefrom a selected distance including a tapered point for penetration into the ground;
   a medial section extending upward from said bottom section comprising an elongated vertical rod;
   a handle section extending from said medial section comprising a curved rod forming at least one "S" shaped loop comprising a first horizontal segment extending outwardly from said medial section at an angle a selected first length and having a proximate end portion curving upward forming a first curved loop extending upward and over said first horizontal segment and past said medical section a selected second length defining a second horizontal section spaced apart from and in alignment with said first horizontal section, said second horizontal segment forming a second curved loop extending upward and over a portion of said second horizontal segment forming a third horizontal segment extending to said medial section spaced apart and in alignment with said second horizontal segment, said third horizontal segment forming an angle extending upward forming a top section;
   and said top section comprising a rod in vertical alignment with said medial section for supporting an article thereon; and
   an arcuate portion extending from said top section including a holding means disposed on a distal end thereof for supporting an article.

2. The lawn stake of claim 1, wherein said medial section, said arcuate portion, said top section, said handle section, and said bottom section are integrally formed from a single elongated rod.

3. The lawn stake of claim 1, wherein said bottom section comprises an auger having a neck angled inwardly toward the center of said main body portion in order to center said bottom section with respect to said medial section and said top section.

4. A lawn stake, comprising:
   a top section of a selected length having an arcuate portion extending therefrom and an integrally formed holding means disposed on a distal end of said arcuate portion for supporting an article;
   a medial section including a means of rotating comprising a handle formed integrally therefrom extending downward from said top section;
   a neck comprising a centrally disposed vertical top portion and a curved or angled bottom portion extending downward and outwardly from said medial section;
   a bottom section extending downward from said bottom portion of said neck, said bottom section comprising an auger including a main body having a plurality of helical coils extending downward a selected distance and having a constant selected helical pitch; and
   said auger including a distal end segment extending downward forming a point.

5. The lawn stake of claim 4, said distal end segment extending downward at a selected variable helical pitch extending from said main body portion.

6. A lawn stake, comprising:
   a top section of a selected length having an arcuate portion extending therefrom and a holding means disposed on a distal end of said arcuate portion for supporting an article;
   a medial section including means of rotating extending downward from said top section;
   said means of rotation comprises a handle section extending from said medial section comprising a curved rod forming at least one "S" shaped loop comprising a first horizontal segment extending outwardly from said medial section at an angle a selected first length and having a proximate end portion curving upward forming a first curved loop extending upward and over said first horizontal segment and past said medical section a selected second length defining a second horizontal section spaced apart from and in alignment with said first horizontal section, said second horizontal segment forming a second curved loop extending upward and over a portion of said second horizontal segment forming a third horizontal segment extending to said medial section spaced apart and in alignment with said second horizontal segment, said third horizontal segment forming an angle extending upward forming a top section;
   a neck comprising a centrally disposed vertical top portion and a curved or angled bottom portion extending downward and outwardly from said medial section;
   a bottom section extending downward from said bottom portion of said neck, said bottom section comprising an auger including a main body having a plurality of helical coils extending downward a selected distance and having a constant selected helical pitch; and said auger including a distal end segment extending downward forming a point.

7. The lawn stake of claim 6, said distal end segment extending downward at a selected variable helical pitch extending from said main body portion.

8. The lawn stake of claim 4, said handle comprising a curved portion of said rod forming at least one loop comprising a first horizontal segment extending outwardly from said medial section at an angle a selected first length and having a proximate end portion curving upward forming a first curved loop extending upward and over said first horizontal segment to said medical section.

9. The lawn stake of claim 8, said handle further comprising a selected second length defining a second horizontal section spaced apart from and in alignment with said first horizontal section, said second horizontal segment forming a second curved loop extending upward and over a portion of said second horizontal segment forming a third horizontal segment extending to said medial section spaced apart and in alignment with said second horizontal segment, said third horizontal segment forming an angle extending upward forming a top section.

\* \* \* \* \*